United States Patent
Uchida (10) Patent No.: US 8,265,608 B2
(45) Date of Patent: Sep. 11, 2012

(54) DATA PROCESSING METHOD FOR PORTABLE COMMUNICATION TERMINAL AND PORTABLE COMMUNICATION TERMINAL

(75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 322 days.

(21) Appl. No.: 12/664,259

(22) PCT Filed: Jun. 6, 2008

(86) PCT No.: PCT/JP2008/060494
§ 371 (c)(1),
(2), (4) Date: Dec. 11, 2009

(87) PCT Pub. No.: WO2009/001659
PCT Pub. Date: Dec. 31, 2008

(65) Prior Publication Data
US 2010/0197282 A1    Aug. 5, 2010

(30) Foreign Application Priority Data
Jun. 22, 2007    (JP) .................................. 2007-164453

(51) Int. Cl.
*H04M 3/42* (2006.01)
(52) U.S. Cl. .................. 455/414.1; 455/414.2; 455/418; 455/452.1; 455/434; 455/550.1
(58) Field of Classification Search ............... 455/414.1, 455/412.1, 412.2, 414.2, 410, 418, 413, 456.1, 455/456.2, 456.3, 550.1
See application file for complete search history.

(56) References Cited

U.S. PATENT DOCUMENTS

| 2007/0077925 A1* | 4/2007 | Hiyama ........................ 455/420 |
| 2007/0099610 A1* | 5/2007 | Kim et al. .................. 455/432.2 |
| 2007/0249322 A1* | 10/2007 | Benco et al. .................. 455/410 |
| 2007/0254697 A1* | 11/2007 | Sugio et al. ................ 455/556.2 |

FOREIGN PATENT DOCUMENTS

| JP | 11-120138 A | 4/1999 |
| JP | 2002024175 A | 1/2002 |
| JP | 2007034686 A | 2/2007 |
| JP | 2007053626 A | 3/2007 |

OTHER PUBLICATIONS

International Search Report for PCT/JP2008/060494 mailed Aug. 19, 2008.

* cited by examiner

*Primary Examiner* — Kathy Wang-Hurst (57) ABSTRACT

A terminal data storage section (18) of a portable communication terminal (10) stores the importance level of each piece of stored data. A connection state prediction judging section (12) predicts a change in the communication state of the connection to a server (20). A terminal processing level determining section (13) determines the terminal processing level of data based on the prediction result. When a data access becomes necessary, a data access managing section (15) determines whether a data access destination is the portable communication terminal (10) itself or the server (20) based on the importance level of the data and the then terminal processing level. When the terminal processing level is changed, a data hold managing section (14) deletes the data whose importance level is changed to an importance level which inhibits the data from being held at the changed terminal processing level from the terminal data storage section (18).

16 Claims, 7 Drawing Sheets

FIG. 2

| HEADER INFORMATION | | | | CONTENTS (ENTITY) OF DATA |
|---|---|---|---|---|
| IMPORTANCE LEVEL | UPDATE DATA FLAG | DATA TYPE INFORMATION | ENTRY INFORMATION | |
| 0 | | MUSIC TITLE LIST | | 1: ENKA "OO", 2: HIP-HOP "AAA", 3: |
| 3 | 0 | TELEPHONE BOOK | PERSON A | (NO DATA) |
| 2 | 1 | MAIL IN EDITION | NO. 2 | TODAY IS A LUCKY DAY··· |
| 1 | 0 | RECEIVED MAIL | NO. 25 | THANK YOU FOR YOUR COOPERATION··· |
| 0 | | SAVED Web PAGE | URL1 | ··· |
| 1 | 1 | SCHEDULE | 7/23 | WILL HAVE MEETING IN THE AFTERNOON··· |
| 0 | | DOCUMENT FILE | CONFERENCE RELATED | TODAY'S CONFERENCE IS··· |
| ··· | ··· | ··· | ··· | |

FIG. 3

| TERMINAL PROCESSING LEVEL | IMPORTANCE LEVEL OF DATA (→IMPORTANT) | | | | |
|---|---|---|---|---|---|
| | | 0 | 1 | 2 | 3 |
| | 0 | S | S | S | S |
| | 1 | T | S | S | S |
| | 2 | T | T | S | S |
| | 3 | T | T | T | S |
| | 4 | T | T | T | T |

FAST COMMUNICATION ↑
↓ SLOW COMMUNICATION

DATA PROCESSING METHOD FOR PORTABLE COMMUNICATION TERMINAL AND PORTABLE COMMUNICATION TERMINAL

This application is the National Phase of PCT/JP2008/060494, filed Jun. 6, 2008, which is based upon and claims the priority of Japanese Patent Application No. 2007-164453 filed on Jun. 22, 2007, and the disclosure of the Japanese Patent Application is incorporated herein by reference in its entirety.

TECHNICAL FIELD

The present invention relates to a data processing method for a portable communication terminal, and a portable communication terminal.

BACKGROUND ART

Portable communication terminals, typified by a cell phone, store user information or so, such as a telephone book, reception/transmission mail addresses, and mail texts, inside, and perform access, such as referring to the information or using it. When a portable communication terminal is lost, therefore, there is a risk that such confidential user information would be seen by a third person, and personal information or the like would be leaked.

A thin client approach is known which has all data stored in a server and accesses the server at the time of data access to prevent such a risk. Unexamined Japanese Patent Application KOKAI Publication No. 2002-24175 (Patent Document 1) discloses a thin client terminal.

Patent Document 1: Unexamined Japanese Patent Application KOKAI Publication No. 2002-24175

DISCLOSURE OF INVENTION

A thin client terminal which does not hold user data (private data) inside avoids a danger of data leakage when it is lost. However, the terminal has a problem such that it cannot access data in a server when it is out of the communication range. In addition, the communication state is likely to vary according to the location or time zone. For example, the communication speed becomes higher near an access point or a base station, but becomes lower at a location far therefrom. At a crowded location, such as a downtown, many users share the communication zone, so that the communication speed becomes lower. The communication speed varies according to various conditions; for example, the congestion makes the communication speed lower in a time zone where there are many users, whereas the communication speed becomes higher in a time zone where there are few users. This raises a problem such that even with a terminal being connected, when the communication speed is low, data access takes time, deteriorating the response and lowering the user's convenience.

It is therefore an object of the present invention to address the above problems and provide a data processing method for a portable communication terminal, and a portable communication terminal, which can reduce the risk of leakage of confidential information when the portable communication terminal is lost, and secure the user's convenience even in a poor communication state.

To achieve the object, according to a first aspect of the present invention, there is provided a data processing method for a portable communication terminal connected to a server over a communication network, comprising:

predicting a future change in a communication state in connection with the server;

determining a terminal processing level indicating a level of data which is permitted to be held in the portable communication terminal based on a prediction result; and limiting data to be held in the portable communication terminal based on the determined terminal processing level and an importance level given to each type of data.

When it is predicted that the communication state will be improved, restriction may be made so as to decrease data to be held in the portable communication terminal.

When the terminal processing level is changed by a change in the prediction result on the communication state and, in the portable communication terminal, there is update on data whose importance level is changed to an importance level which inhibits the data from being held at the changed terminal processing level, the update content is reflected on the server and the data with the changed importance level may be then deleted from the portable communication terminal.

When it is predicted that the communication state will be deteriorated, restriction may be made so as to increase data to be held in the portable communication terminal.

When the terminal processing level is changed by a change in the prediction result on the communication state, data whose importance level is changed to an importance level which permits the data to be held at the changed terminal processing level may be read from the server and copied into the portable communication terminal.

In predicting a change in the communication state, positional information and movement information of the portable communication terminal may be acquired, and the acquired information may be used in predicting a future change in a communication state in connection with the server.

Upon reception of a data read request, it may be determined whether or not the determined terminal processing level is equal to or higher than an importance level given to data to be read out which is indicated by the received read request, when it is determined that the determined terminal processing level is equal to or higher than the importance level, the data to be read may be read from the portable communication terminal, and when it is determined that the determined terminal processing level is less than the importance level, the data to be read may be read from the server.

Upon reception of a data write request, it may be determined whether or not the determined terminal processing level is equal to or higher than an importance level given to data to be written which is indicated by the received write request, when it is determined that the determined terminal processing level is equal to or higher than the importance level, the data to be written may be written in the portable communication terminal, and when it is determined that the determined terminal processing level is less than the importance level, the data to be written may be written in the server.

To achieve the object, according to a second aspect of the invention, there is provided a portable communication terminal connected to a server over a communication network, comprising:

a terminal data storage section that stores an importance level of data to be held for each type of the data;

connection state prediction judging section that predicts a future change in a communication state for connection with the server;

terminal processing level determining section that determines a terminal processing level of data to be processed in the terminal itself based on a prediction result predicted by the connection state prediction judging section; and a data access managing section that, when it is necessary to gain access to data, determines a data access destination based on the importance level of the data to be accessed and the then terminal processing level, and accesses the determined access destination.

When the connection state prediction judging section predicts that the communication state will be improved, the terminal processing level determining section may decrement the terminal processing level.

The portable communication terminal may further comprise a data hold managing section that, when the terminal processing level is changed and, in the portable communication terminal, there is update on data whose importance level is changed to an importance level which inhibits the data from being held at the changed terminal processing level, reflects an update content on corresponding data stored in the server, and then deletes the data whose importance level is changed to an importance level which inhibits the data from being held from the terminal data storage section.

When the connection state prediction judging section predicts that the communication state will be deteriorated, the terminal processing level determining section may increment the terminal processing level.

When the terminal processing level is changed by a change in the prediction result on the communication state, data whose importance level is changed to an importance level which permits the data to be held at the changed terminal processing level may be read from the server and copied into the terminal data storage section.

The connection state prediction judging section may have a unit of acquiring positional information and movement information of the portable communication terminal, and may use the acquired information in predicting a future change in the communication state.

Upon occurrence of a data read request,
the data access managing section may determine whether or not the terminal processing level at that time is equal to or higher than an importance level given to data to be read out which is indicated by the received read request, may read the data to be read from the portable communication terminal when it is determined that the determined terminal processing level is equal to or higher than the importance level, and may read the data to be read from the server when it is determined that the determined terminal processing level is less than the importance level.

Upon occurrence of a data write request,
the data access managing section may determine whether or not the terminal processing level at that time is equal to or higher than an importance level given to data to be written which is indicated by the received write request, may write the data to be written into the portable communication terminal when it is determined that the determined terminal processing level is equal to or higher than the importance level, and may write the data to be written into the server when it is determined that the determined terminal processing level is less than the importance level.

EFFECT OF THE INVENTION

The present invention can reduce the risk of leakage of confidential information when the portable communication terminal is lost, and secure the user's convenience even in a poor communication state due to out of communication area, low communication speed or the like. This is because a change in a future communication state is predicted, and data to be held in the portable communication terminal is limited based on the terminal processing level determined according to the prediction result and the importance level given to each data.

DESCRIPTION OF REFERENCE NUMERALS 10, 10a portable communication terminal
11 communication section
12 connection state prediction judging section
13 terminal processing level determining section
14 data hold managing section
15 data access managing section
16 user interface section
161 input section
162 display section
17 data processing section
18 terminal data storage section
19 positioning section
20, 20a server
21 communication section
22 server data access managing section
23 server data storage section
24 base station information holding section
30 network

BEST MODE FOR CARRYING OUT THE INVENTION

Figure 1:
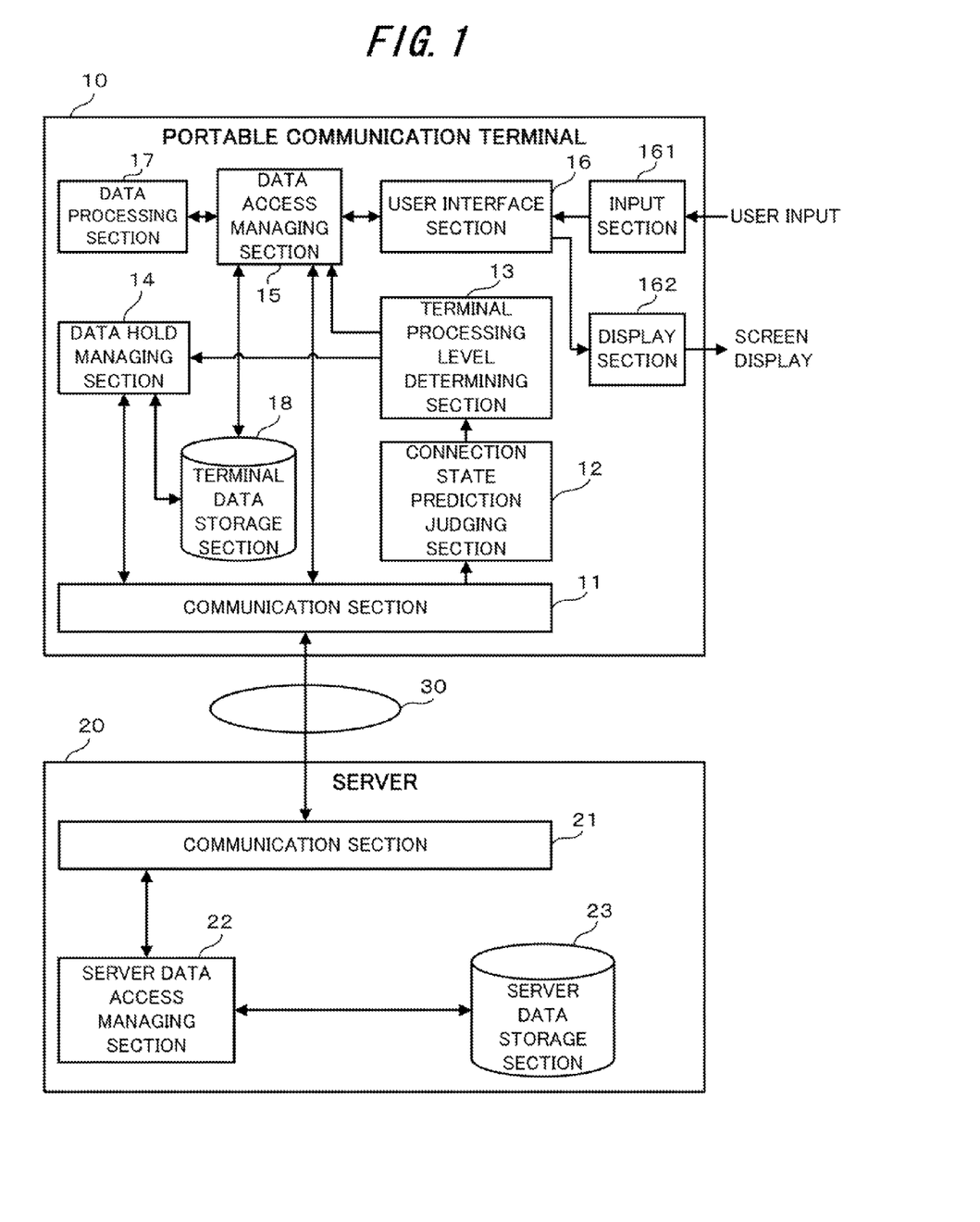
FIG. 1 is a functional block diagram showing the configuration of one embodiment of the present invention.

Next, an embodiment of the present invention will now be described with reference to the accompanying drawings. FIG. 1 is a functional block diagram showing the configuration of one embodiment of the invention.

Referring to FIG. 1, a portable communication terminal 10 and a server 20 are connected together over a network 30 (e.g., public circuit). The network 30 can be realized by wireless, a cable or a combination thereof.

The portable communication terminal 10 processes data in the terminal itself, and can use data in the server 20 by communicating with the server 20 over the network 30. There are following three modes to use data in the server 20.

(1) Data recorded in the server 20 is transferred to the portable communication terminal 10. Then, the portable communication terminal 10 processes (uses) the transferred data.

(2) Data processing is not performed on the portable communication terminal 10, but on the server 20, and only the processing result is transmitted to the portable communication terminal 10. Then, the portable communication terminal 10 displays the transmitted data processing result.

(3) Data processing is performed on the server 20 as a virtual computer, and only the display screen to display the processing result is transmitted to the portable communication terminal 10. Then, the portable communication terminal 10 displays the transmitted display screen.

Whether data is saved/processed by the portable communication terminal 10 or is saved/processed by the server 20 is determined by comparing a data importance level given to each data with a terminal processing level set in the portable communication terminal 10 according to the communication state.

As a specific configuration, the portable communication terminal 10 includes a communication section 11, a connection state prediction judging section 12, a terminal processing level determining section 13, a data hold managing section 14, a data access managing section 15, a user interface section 16, an input section 161, a display section 162, a data processing section 17, and a terminal data storage section 18.

The functions (processes) of the connection state prediction judging section 12, the terminal processing level determining section 13, the data hold managing section 14, and the data access managing section 15 are physically realized by an unillustrated CPU (Central Processing Unit) executing an operation program stored in an unillustrated storage device, such as ROM (Read Only Memory), RAM (Random Access Memory) or a memory.

The communication section 11 has a communication interface or the like, and achieves a function to connect to the network 30. The communication section 11 also has a function of informing the connection state prediction judging section 12 of information on the communication state.

The connection state prediction judging section 12 observes and records the current speed of communication (bandwidth) between the portable communication terminal 10 and the network 30 or the server 20 based on the information on the communication state informed by the communication section 11. Observing the communication speed is to discriminate whether, for example, the portable communication terminal 10 and the server 20 are currently connected with a communication bandwidth of the level sufficient to transfer data, so-called broadband, or with a narrower bandwidth, so-called normal bandwidth of the dial-up level, or the portable communication terminal 10 is out of the radio wave range and cannot be connected. Further, the connection state prediction judging section 12 predicts a future communication speed from the records on the old and current communication speeds. If the current communication speed tends to increase as compared with the past one due to factors, such as coming closer to a base station or a reduction in users of the same base station, at the time the portable communication terminal 10 is moving, for example, it is predicted that the future speed will increase further, making the connection state (communication state) better. If the current communication speed tends to decrease as compared with the past one, on the other hand, it is predicted that the future speed will drop further, the connection state (communication state) will become poorer, and can further be a non-connected state (out of range). It is to be noted that the prediction has only to be carried out based on, for example, the continuity of derivative values of the current and past communication speeds observed and recorded, changes in the communication speeds, and so forth.

The terminal processing level determining section 13 determines a terminal processing level based on future communication state prediction information output from the connection state prediction judging section 12. The terminal processing level indicates the level of data which permits the data to be held and processed in the portable communication terminal 10. The terminal processing level determining section 13 basically decrements the terminal processing level when it is predicted that the future communication speed will increase, and increments the terminal processing level when it is predicted that the future communication speed will decrease.

The data hold managing section 14 receives information on the terminal processing level output from the terminal processing level determining section 13 as an input, and manages data based on the information. For example, based on the terminal processing level information output from the terminal processing level determining section 13, the data hold managing section 14 executes processes, such as copying data in the server 20 into the portable communication terminal 10, or writing update data in the portable communication terminal 10 into the server 20 and deleting the data in the portable communication terminal 10; the processes will be elaborated later.

When there is a data access instruction from the user interface section 16 or the data processing section 17, the data access managing section 15 performs a data access operation according to the value of the terminal processing level output from the terminal processing level determining section 13. The data access operation will be elaborated later.

The user interface section 16 receives an input from a user with the input section 161 having ten keys or the like, or displays an output to the user on the display section 162 having a liquid crystal display or the like. Data which is handled by the portable communication terminal 10 includes telephone book data including personal information, such as telephone numbers and e-mail addresses of other persons, and e-mail data transmitted and received by the user. According to the user's operation via the user interface section 16, a read access or a write access to those data is performed. Those data are basically saved in a server data storage section 23 in the server 20, and partly held in the terminal data storage section 18 temporarily.

The data processing section 17 has a function of processing those data when it becomes necessary to process (update, delete, or so) the data.

Figure 2:
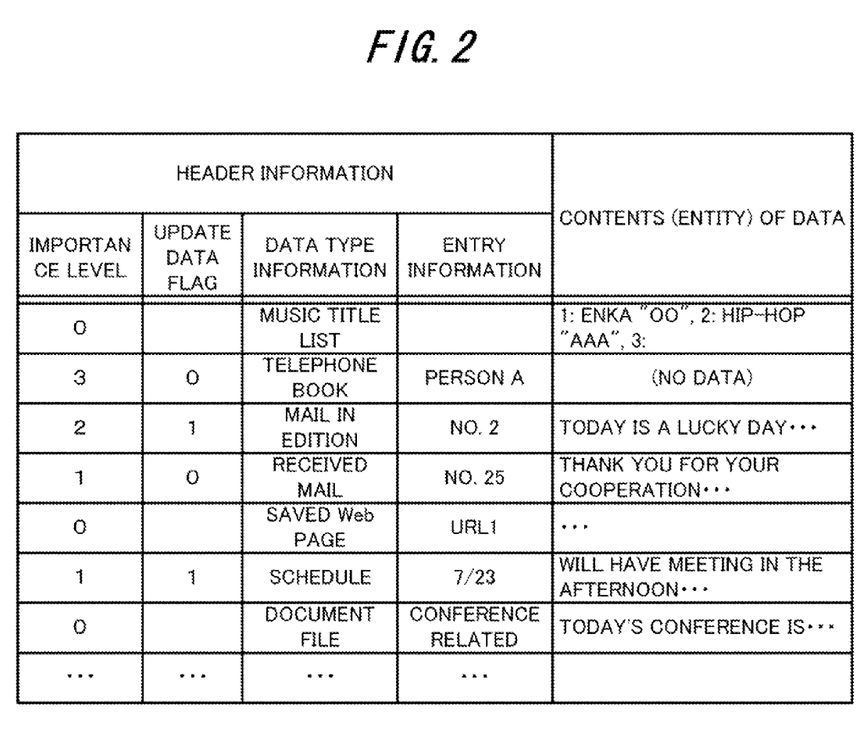
FIG. 2 is a diagram showing one example of the contents of a terminal data storage section according to the embodiment of the invention.

The terminal data storage section 18 saves those data. At the time data is stored in the terminal data storage section 18, an importance level and an update data flag is given to the data according to each type of data as shown in FIG. 2. FIG. 2 is a diagram showing one example of the contents of the terminal data storage section 18 according to one embodiment of the invention. In the diagram, each stored data is structured to have header information and a data content (entity). The header information includes an importance level, an update data flag, data type information, and entry information (for user confirmation) in order from the left side.

The importance level takes a larger value when it is desirable to process the data in the server 20. In general, the higher the importance or confidentiality of data is, the greater the risk of data leakage when holding the data in the portable communication terminal 10, so that the importance level is set large. What importance level is to be given to which data may be designated by a user or may be automatically determined by a system. In the example in FIG. 2, for example, telephone book data, mail data, etc. are set as confidential data having a higher importance level, while a music title list or the like is designated as data having a lower importance level.

The update data flag is a flag indicating if data is updated only in the portable communication terminal 10. When the update data flag is "1" in FIG. 2, for example, it means that the data is updated only in the portable communication terminal 10. That is, the update data flag of "1" indicates that data with the flag should be written in the server 20 (update should be reflected) before being deleted from the portable communication terminal 10. When the update data flag is "0", it means that the data is also updated in the server 20. The update data flag is updated at any time according to the state of data in the portable communication terminal 10. When data is deleted from the portable communication terminal 10, the entity of the data becomes empty and is saved only in the server 20. In FIG. 2, for example, telephone book data with the update data flag of "0" does not have its entity in the portable communication terminal 10 but deleted therefrom.

Returning to FIG. 1, the server 20 includes a communication section 21, a server data access managing section 22, and a server data storage section 23. The communication section 21 achieves a function to connect to the network 30. The server data access managing section 22 has a function of controlling access to the server data storage section 23 in the server 20. With regard to data stored in the terminal data storage section 18 of the portable communication terminal 10, the server data storage section 23 basically saves every entity data.

Figure 3:
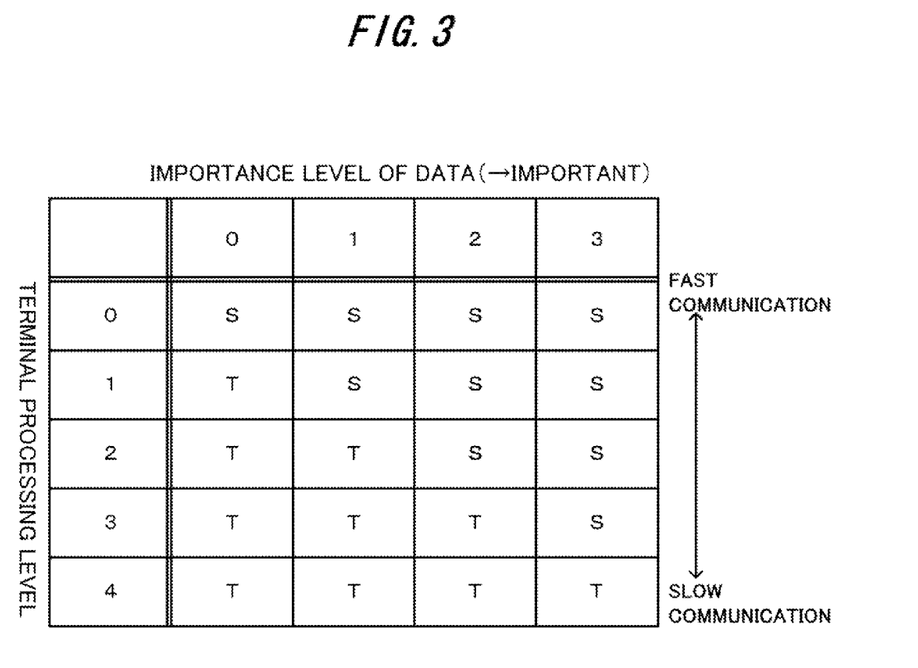
FIG. 3 is a diagram illustrating one example of the access operation rules of a data access managing section according to the embodiment of the invention.

FIG. 3 is a diagram illustrating one example of the access operation rules of the data access managing section 15 according to one embodiment of the invention. The data access managing section 15 operates according to the rules indicated by the table. Suppose that the terminal processing level takes integer values from "0" (minimum) to "4" (maximum), and the importance level of data takes integer values from "0" (minimum) to "3" (maximum). With the terminal processing level being N, when data whose importance level is equal to or higher than N is to be handled, access to the server 20 is necessary, and when data whose importance level is less than N is to be handled, access within the portable communication terminal 10 is possible. In the diagram, "S" indicates that the access destination of data is the server 20, and "T" indicates that the access destination is the portable communication terminal 10.

For example, FIG. 2 shows a case where the terminal processing level at that time is "3", and in case of processing telephone book data with the importance level of "3" equal to or higher than "3", access to the server 20 is necessary and the telephone book data does not have an entity in the portable communication terminal 10. In case of processing the telephone book data, therefore, the server 20 is accessed.

Other data than the telephone book data has an importance level less than "3" and has an entity in the portable communication terminal 10, so that the other data is accessed (processed) in the portable communication terminal 10.

The terminal processing level of "0" indicates that sufficiently stable and fast connection is possible, so that data is not placed in the portable communication terminal 10 and the server 20 is directly accessed for every data according to the rules shown in FIG. 3.

When the terminal processing level is "4" (maximum), the portable communication terminal 10 may be out of the range or so, so that the server 20 cannot be used in data processing and every data is locally accessed and processed in the portable communication terminal 10 according to the rules shown in FIG. 3.

When the data access managing section 15 directly accesses data in the server 20, a data read request from the portable communication terminal 10 is transmitted to the server 20 via the communication sections 11, 21 of both the portable communication terminal 10 and server 20. Then, the data read request is converted to a read request for the server data storage section 23 by the server data access managing section 22 of the server 20, and data is read from the server data storage section 23. The read data is transmitted to the data access managing section 15 of the portable communication terminal 10 via the communication sections 21, 11 in the reverse route, and used (processed) in the data processing section 17, or is written in the terminal data storage section 18 as needed.

As well as in the case of a data write request from the portable communication terminal 10, a data write request is transmitted to the server 20 via the communication sections 11, 21 of both the portable communication terminal 10 and server 20. Then, the data write request is converted to a write request for the server data storage section 23 by the server data access managing section 22 of the server 20, and data is written into the server data storage section 23. Those accesses are reliably carried out, encrypted by an adequate protocol mutually agreed by a typical publicly known communication technique, or subjected to a countermeasure against communication errors.

Figure 4:
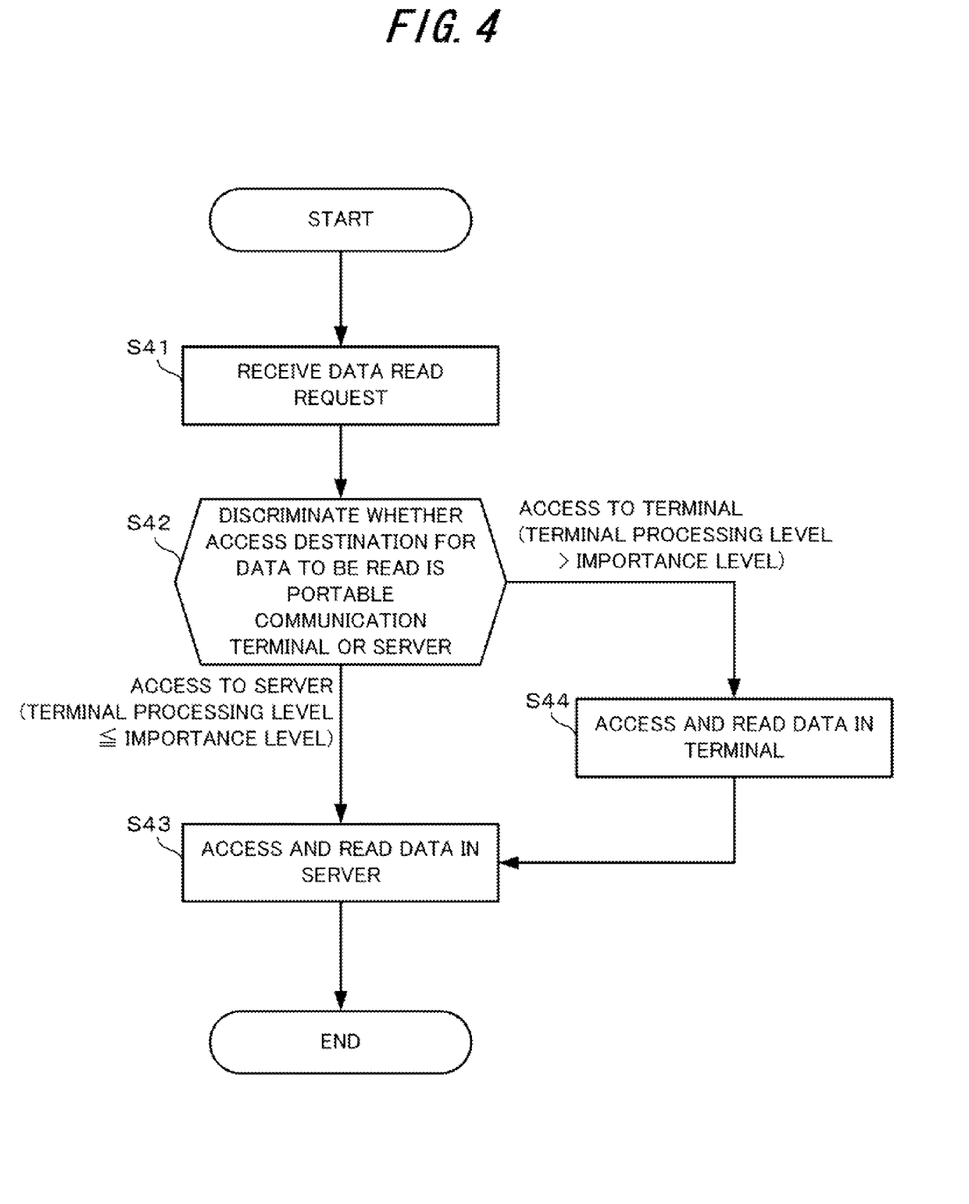
FIG. 4 is a flowchart illustrating an operation upon occurrence of a data read request according to the embodiment of the invention.

Next, the operation of one embodiment of the invention will be described by referring to the accompanying drawings. FIG. 4 is a flowchart for explaining an operation upon generation of a data read request through a user operation or from the data processing section 17 when the user is using the portable communication terminal 10.

First, upon reception of the data read request (step S41), the data access managing section 15 discriminates whether the access destination for data to be read is the portable communication terminal 10 itself or the server 20 based on the importance level of the data to be read and the terminal processing level (step S42). Suppose that there has occurred a read request for telephone book data (importance level "3") of a person A in FIG. 2. The terminal data storage section 18 in the portable communication terminal 10 is accessed when the level is "T" in the table in FIG. 3, i.e., when the then terminal processing level exceeds the importance level of data to be accessed. In this case, when the terminal processing level is "4", for example, the condition is fulfilled, so that the entity of data is present in the portable communication terminal 10, and the data access managing section 15 discriminates that the access destination lies in the portable communication terminal 10. Therefore, the data access managing section 15 accesses the terminal data storage section 18, and executes a process of reading the entity of data in response to the data read request (step S44).

When the then terminal processing level is equal to or lower than the importance level of the data in step S42, on the other hand, it is discriminated that the access destination is the server 20. When the terminal processing level is "2", for example, the level is "S" in the table in FIG. 3, showing that the data is obtainable by accessing the server. In this case, the data read request is transmitted to the server 20 from the data access managing section 15 via the communication section 11 and the network 30. In the server 20, the server data access managing section 22 receives the data read request via the communication section 21, and reads data from the server data storage section 23 in response to the request. The server data access managing section 22 transmits the read data to the portable communication terminal 10 by means of the communication section 21. The data transmitted from the server 20 is received by the data access managing section 15 via the communication section 11 and is used as an access result (step S43).

The above is a sequence of processes when a data read request is generated.

In the above manner, when a data read request is generated, it is discriminated whether the access destination for data to be read is the portable communication terminal 10 or the server 20 based on the importance level of the data to be read and the terminal processing level, and a read process is executed at each access destination discriminated.

Figure 5:
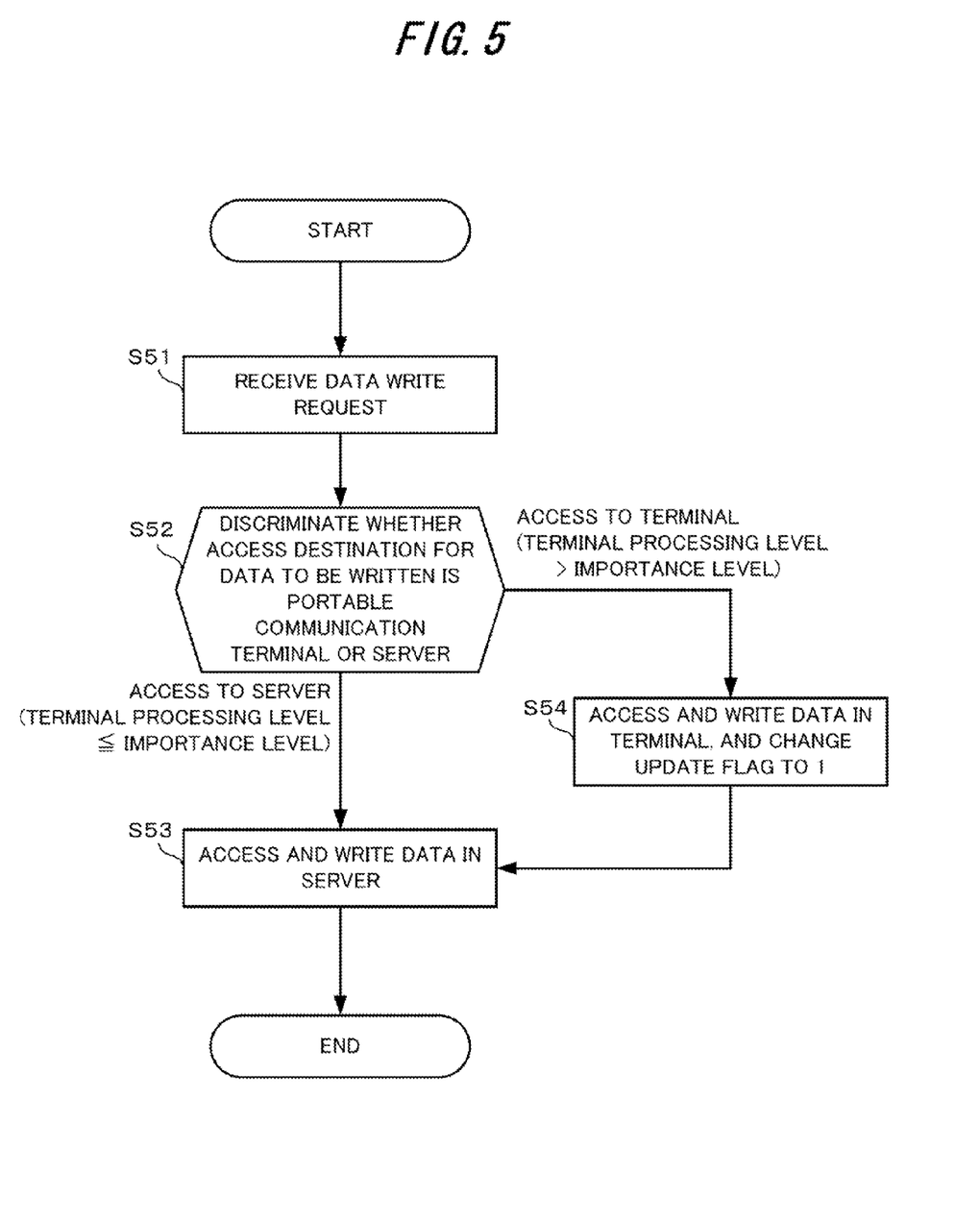
FIG. 5 is a flowchart illustrating an operation upon occurrence of a data write request according to the embodiment of the invention.

Next, a description will be given of the operation in the case where the user or the data processing section 17 has made a write request for data (e.g., mail in edition No. 2 in FIG. 2 (importance level "2")) at the time the user is using the portable communication terminal 10. FIG. 5 is a flowchart for explaining the operation upon occurrence of the data write request according to one embodiment of the invention.

First, upon reception of the data write request (step S51), the data access managing section 15 discriminates whether the access destination for data to be written is the portable communication terminal 10 itself or the server 20 based on the importance level of the data to be written and the terminal processing level (step S52). It is accessible in the portable communication terminal 10 when the level is "T" in FIG. 3, i.e., when the then terminal processing level exceeds the importance level of the data (e.g., the terminal processing level of "3"). In this case, the data access managing section 15 writes predetermined information in the entity of the data to be written, which is saved in the terminal data storage section 18, in response to the write request, and, further, the update data flag of the data is set to "1" (step S54).

The update data flag "1" indicates that the data is updated only in the portable communication terminal 10, and needs to be written (updated) in the server 20 before being deleted from the portable communication terminal 10 when such is a case. This update operation will be elaborated later.

When the terminal processing level is equal to or lower than the importance level of the data (e.g., the terminal processing level of "2") in step S52, the level is "S" in FIG. 3, showing that the data needs to be written by accessing the server 20. In this case, the data write request is transmitted to the server 20 from the data access managing section 15. The server data access managing section 22 in the server 20, which has received the request, writes predetermined information in the entity of the data to be written, saved in the server data storage section 23, in response to the write request (step S53). The above is a sequence of processes when a data write request is generated.

In the above manner, when a data write request is generated, it is discriminated whether the access destination for data to be written is the portable communication terminal 10 or the server 20 based on the importance level of the data to be written and the terminal processing level, and a write process is executed at each access destination discriminated.

Figure 6:
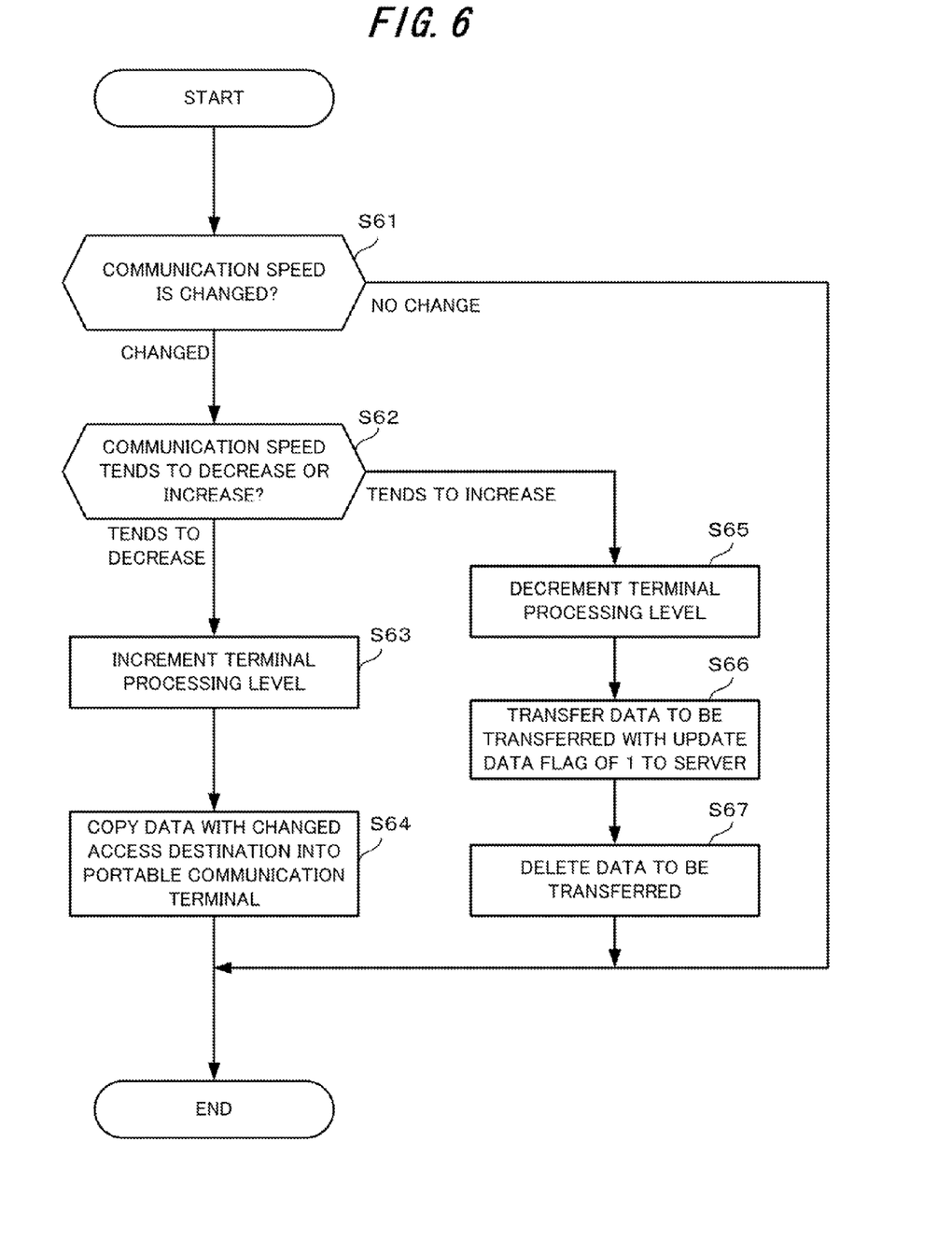
FIG. 6 is a flowchart illustrating an operation originating from observation of a connection state at a given interval by a connection state prediction judging section according to the embodiment of the invention.

FIG. 6 is a flowchart for explaining an operation originating from observation of the connection state at a given interval by the connection state prediction judging section 12 according to one embodiment of the invention.

The connection state prediction judging section 12 observes if there is a change in communication speed at a given interval (step S61). When a change is not observed in step S61, no particular action is taken and the process is terminated. When a change in connection speed is observed as a result of, for example, movement of the portable communication terminal 10, the speed is compared with the past communication speeds, and the connection state prediction judging section 12 discriminates whether the communication speed tends to increase or decrease (step S62).

When it is discriminated in step S62 that the communication speed has increased, the connection state prediction judging section 12 transmits information indicating such to the terminal processing level determining section 13. Then, upon reception of the information, the terminal processing level determining section 13 decrements the terminal processing level (step S65). With regard to data processing, when the terminal processing level is decremented, a larger amount of data is to be processed in the server 20.

When the terminal processing level is decremented, some of data which has been accessed in the portable communication terminal 10 so far is to be processed in the server 20, making it necessary to transfer necessary data for server processing to cope with the processing and delete the data from the portable communication terminal 10. To achieve it, first, the data hold managing section 14 transfers data to be transferred which has been updated in the portable communication terminal 10 to have an update data flag of "1" to the server 20 (step S66). That is, a change in the data only in the portable communication terminal 10 is reflected on corresponding data in the server 20. The transfer of the data is carried out as the data hold managing section 14 transfers the data in the terminal data storage section 18 to the server 20 via the communication section 11 and the server data access managing section 22 having received the data writes the data in the server data storage section 23.

Thereafter, the data hold managing section 14 deletes the entity of data to be transferred stored in the terminal data storage section 18 (step S67). When the terminal processing level is decremented to "2" from "3", for example, as a specific example, data with the importance level of "2" will newly be accessed in the server (changing the access destination) as apparent from FIG. 3. Accordingly, the data hold managing section 14 first sequentially writes the entity of data which has the importance level of "2" and the update data flag of "1" into the server 20 (step S66). Then, after every data with the importance level of "2" and the update data flag of "1" is written into the server 20, the data hold managing section 14 deletes every data with the importance level of "2" from the terminal data storage section 18 (step S67).

When the terminal processing level becomes "0" as another example, every data will be accessed in the server as apparent from FIG. 3. In this case, the data hold managing section 14 first sequentially writes the entity of data in the portable communication terminal 10 which has the update data flag of "1" into the server 20 (step S66), and then deletes every entity portion of data in the terminal data storage section 18 (step S67).

When it is discriminated in step S62 that the communication speed tends to decrease, on the other hand, the connection state prediction judging section 12 transmits information indicating such to the terminal processing level determining section 13. Then, upon reception of the information, the terminal processing level determining section 13 increments the terminal processing level (step S63). When the terminal processing level is incremented, a larger amount of data is to be processed in the portable communication terminal 10 in the data processing. That is, some of data which has been accessed in the server 20 so far is to be accessed in the portable communication terminal 10, and the data hold managing section 14 writes (copies) the corresponding data (data with a changed access destination) into the portable communication terminal 10 to cope with the access (step S64).

When the terminal processing level is incremented to "3" from "2", for example, as a specific example, data with the importance level of "2" will newly be accessed in the portable communication terminal as apparent from FIG. 3. Accordingly, data with the importance level of "2" is sequentially read from the server data storage section 23 of the server 20, and is written in the terminal data storage section 18 via the server data access managing section 22, the communication section 21, the network 30, the communication section 11 and the data hold managing section 14. When the terminal processing level becomes "4" as another example, every data will be accessed in the terminal as apparent from FIG. 3, so that every data is sequentially read from the server data storage section 23 of the server 20, and the data hold managing section 14 writes the read data in the terminal data storage section 18. Then, the process is terminated.

In the above manner, it is regularly discriminated whether the communication speed tends to increase or decrease, and the terminal processing level is incremented/decremented according to the tendency. According to the increment/decrement of the terminal processing level, the processes, such as copy and deletion of data to be managed (saved) in the portable communication terminal 10 and the server 20, are executed.

Figure 7:
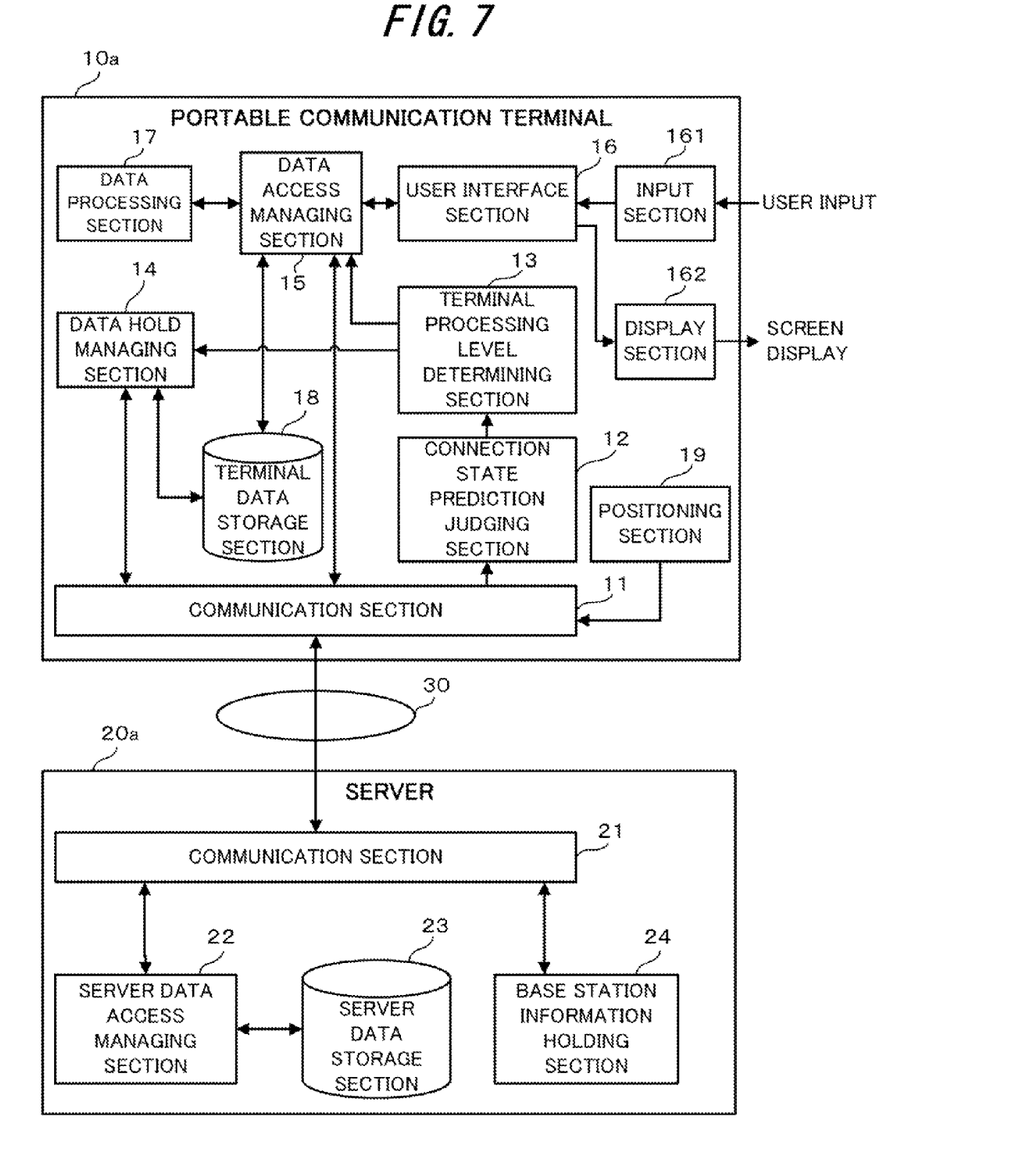
FIG. 7 is a functional block diagram showing the configuration of another embodiment of the invention.

Next, another embodiment of the invention will be described referring to the accompanying drawings. The precision of prediction of a change in communication state communication state can be enhanced by using positional information obtained from, for example, a GPS (Global Positioning System) or the like. FIG. 7 is a functional block diagram showing the configuration of another embodiment of the invention. According to the embodiment, a portable communication terminal 10*a* further has a positioning section 19 as compared with the portable communication terminal 10 in FIG. 1, and has the other blocks identical to those in FIG. 1. According to the embodiment, a server 20*a* further has a base station information holding section 24 as compared with the server 20 in FIG. 1, and has the other blocks identical to those in FIG. 1.

The positioning section 19 of the portable communication terminal 10*a* measures the current position of the terminal by means of the GPS or the like from time to time to compute movement information of the portable communication terminal 10*a* (e.g., changes in position, direction, speed, etc.). The base station information holding section 24 of the server 20*a* holds the positional information of base stations.

The positioning section 19 of the portable communication terminal 10*a* notifies the base station information holding section 24 of the server 20*a* of the measured positional information and movement information via the communication section 11. The base station information holding section 24 searches for a base station around the position of the portable communication terminal 10*a* indicated by the notified positional information, and notifies the connection state prediction judging section 12 of the portable communication terminal 10*a* of the positional information of the searched base station. Accordingly, the connection state prediction judging section 12 compares the positional information and movement information of the portable communication terminal 10*a* with the positional information of the base station to predict a change in communication state. It can be predicted that if the portable communication terminal 10*a* is moving to approach the base station, for example, the future communication speed will increase, whereas if the portable communication terminal 10*a* is moving away from the base station, the future communication speed will decrease.

It is to be noted that the positional information of a base station may be acquired other than from the server 20*a* but from another means outside the portable communication terminal 10*a*. Further, information, such as the number of terminals in connection, the use bandwidth and the communication noise level for each base station, may be acquired through an external information source to be used in the prediction of the communication speed in the connection state prediction judging section 12. Using information from another positioning means or service information on trains or the like, information on, for example, when the portable communication terminal 10*a* of a user located in a subway will arrive at a station and comes to a connection state, or when it becomes out of the communicable range during movement between stations, may be acquired and used in the prediction of the communication speed in the connection state prediction judging section 12.

Although the foregoing description of the embodiments has been given of an example of using a wireless public circuit, seamless connection over networks having different connection speeds based on wireless LAN or future wireless connection technologies can be used as well. In such a case, map information showing where hot spots of wireless LAN are located and where and at what connection speed the connection is possible can be used together with the current position of the terminal in the prediction of the communication speed in the connection state prediction judging section 12.

The portable communication terminal 10 according to the present invention can have its functions achieved by a computer and programs as well as the hardware basis. The programs are provided by recording in a computer readable recording medium, such as a magnetic disk or a semiconductor memory, are loaded into the computer, at the time the computer is powered on, to control the operation of the computer, allowing the computer to function as the portable communication terminal 10 according to the foregoing embodiment and execute the processes illustrated in FIGS. 4, 5 and 6.

The present invention is not limited to the foregoing embodiments, but may be embodied in various forms without departing from the spirit or scope of the invention.

Industrial Applicability

The present invention can be preferably adapted to a portable communication terminal which holds user information inside.

The invention claimed is:

1. A data processing method for a portable communication terminal connected to a server over a communication network, comprising:
    predicting a future change in a communication state of a connection between the portable communication terminal and the server based on a record of communication speed recorded in reference to the connection;
    determining a terminal processing level indicating a level of data which is permitted to be held in the portable communication terminal based on the future change in the communication state that has been predicted;
    determining an importance level for each type of data of one or more types of data; and
    limiting data to be held in the portable communication terminal based on the terminal processing level that has been determined and on the importance level that has been determined for each type of data.

2. The data processing method according to claim 1, wherein when it is predicted that the communication state will be improved, restriction is made so as to decrease data to be held in the portable communication terminal.

3. The data processing method according to claim 1, wherein when the terminal processing level is changed by a change in the prediction result on the communication state and, in the portable communication terminal, there is update on data whose importance level is changed to an importance level which inhibits the data from being held at the changed terminal processing level, the update content is reflected on the server and the data with the changed importance level is then deleted from the portable communication terminal.

4. The data processing method according to claim 1, wherein when it is predicted that the communication state will be deteriorated, restriction is made so as to increase data to be held in the portable communication terminal.

5. The data processing method according to claim 1, wherein when the terminal processing level is changed by a change in the prediction result on the communication state, data whose importance level is changed to an importance level which permits the data to be held at the changed terminal processing level is read from the server and copied into the portable communication terminal.

6. The data processing method according to claim 1, wherein in predicting a change in the communication state, positional information and movement information of the portable communication terminal are acquired, and the acquired information are used in predicting a future change in a communication state in connection with the server.

7. The data processing method according to claim 1, wherein upon reception of a data read request, it is determined whether or not the determined terminal processing level is equal to or higher than an importance level given to data to be read out which is indicated by the received read request, when it is determined that the determined terminal processing level is equal to or higher than the importance level, the data to be read is read from the portable communication terminal, and when it is determined that the determined terminal processing level is less than the importance level, the data to be read is read from the server.

8. The data processing method according to claim 1, wherein upon reception of a data write request, it is determined whether or not the determined terminal processing level is equal to or higher than an importance level given to data to be written which is indicated by the received write request, when it is determined that the determined terminal processing level is equal to or higher than the importance level, the data to be written is written in the portable communication terminal, and when it is determined that the determined terminal processing level is less than the importance level, the data to be written is written in the server.

9. A portable communication terminal connected to a server over a communication network, comprising:

a terminal data storage section that stores an importance level of data to be held for each type of data of one or more types of data;

connection state prediction judging section that predicts a future change in a communication state of a connection between the portable communication terminal and the server based on a record of communication speed recorded in reference to the connection;

terminal processing level determining section that determines a terminal processing level of data to be processed in the terminal itself based on the future change in the communication state that has been predicted by the connection state prediction judging section; and a data access managing section that, when it is necessary to gain access to data that resides on one of the server and the portable communication terminal, determines a data access destination based on the importance level of the data to be accessed and on the terminal processing level that has been determined, and accesses the determined access destination.

10. The portable communication terminal according to claim 9, wherein when the connection state prediction judging section predicts that the communication state will be improved, the terminal processing level determining section decrements the terminal processing level.

11. The portable communication terminal according to claim 9, further comprising a data hold managing section that, when the terminal processing level is changed and there is update on data whose importance level is changed to an importance level which inhibits the data from being held at the changed terminal processing level, reflects an update content on corresponding data stored in the server, and then deletes the data whose importance level is changed to an importance level which inhibits the data from being held from the terminal data storage section.

12. The portable communication terminal according to claim 9, wherein when the connection state prediction judging section predicts that the communication state will be deteriorated, the terminal processing level determining section increments the terminal processing level.

13. The portable communication terminal according to claim 9, wherein when the terminal processing level is changed by a change in the prediction result on the communication state, data whose importance level is changed to an importance level which permits the data to be held at the changed terminal processing level is read from the server and copied into the terminal data storage section.

14. The portable communication terminal according to claim 9, wherein the connection state prediction judging section has a unit of acquiring positional information and movement information of the portable communication terminal, and uses the acquired information in predicting a future change in the communication state.

15. The portable communication terminal according to claim 9, wherein upon occurrence of a data read request, the data access managing section determines whether or not the terminal processing level at that time is equal to or higher than an importance level given to data to be read out which is indicated by the received read request, reads the data to be read from the portable communication terminal when it is determined that the determined terminal processing level is equal to or higher than the importance level, and reads the data to be read from the server when it is determined that the determined terminal processing level is less than the importance level.

16. The portable communication terminal according to claim 9, wherein upon occurrence of a data write request, the data access managing section determines whether or not the terminal processing level at that time is equal to or higher than an importance level given to data to be written which is indicated by the received write request, writes the data to be written into the portable communication terminal when it is determined that the determined terminal processing level is equal to or higher than the importance level, and writes the data to be written into the server when it is determined that the determined terminal processing level is less than the importance level.

* * * * *